United States Patent [19]

Devaux

[11] Patent Number: 5,559,628
[45] Date of Patent: Sep. 24, 1996

[54] LIGHT PULSE GENERATOR

[75] Inventor: Fabrice Devaux, Paris, France

[73] Assignee: France Telecom, Paris, France

[21] Appl. No.: 268,813

[22] Filed: Jun. 30, 1994

[30] Foreign Application Priority Data

Jul. 2, 1993 [FR] France ................................ 93 08138

[51] Int. Cl.$^6$ ..................................................... G02F 1/03
[52] U.S. Cl. ............................................. 359/248; 257/431
[58] Field of Search .................................. 359/248, 276, 359/260, 264; 257/293, 431, 84, 85; 385/2

[56] References Cited

U.S. PATENT DOCUMENTS

| | | |
|---|---|---|
| 3,748,597 | 7/1973 | Reinhart . |
| 4,766,471 | 8/1988 | Ovshinsky et al. ................ 357/19 |
| 5,126,553 | 6/1992 | England et al. ................ 250/211 J |

OTHER PUBLICATIONS

L'Echo Des Recherches, No. 149, 1992, France pp. 29–38, Bigan E'Guided wave electro–absorbing modulators for 1.55 mu m optical links'.

Journal of Lightwave Technology, vol. 11, No. 3, Mar. 1193, New York US pp. 468–473.
Electronics Letters, vol. 28, No. 11, May 1992, Stevenage GB, pp. 1007–1008 XP000363642.

Primary Examiner—Georgia Y. Epps
Assistant Examiner—Dawn-Marie Bey
Attorney, Agent, or Firm—Blakely, Sokoloff, Taylor & Zafman

[57] ABSTRACT

The light pulse generator includes a source for generating a light beam, an electroabsorbent modulator for modulating the light beam into light pulses, and means for applying voltage control to the modulator. The electroabsorbent modulator includes at least two doped layers and between them at least one intermediate layer that is made of a material that is not intentionally doped, and that has an electroabsorbent material included therein. The absorbent or transparent state of the intermediate layer is controlled by a voltage applied between two of the doped layers that have doping of the same sign, the transmissivity of the modulator as a function of the voltage controlling it being at a maximum in the vicinity of zero volts and being symmetrical thereabout.

5 Claims, 3 Drawing Sheets

LIGHT PULSE GENERATOR

The present invention relates to a light pulse generator of the type that include an electroabsorbent modulator.

BACKGROUND OF THE INVENTION

Light pulse generators using electroabsorbent modulators are applicable in technical fields that require light pulses of short-duration to be generated.

For example, they are used in measurement apparatuses for observing high-speed chemical or physical phenomena.

They are also used in the field of long distance telecommunications for transmission over optical fibers of high bit rate binary data encoded by using soliton pulses or by using conventional RZ modulation.

For a discussion of the present state of the art concerning electroabsorbent modulators, reference may advantageously be made to the article by E. Bigan "Modulateurs électroabsorbants en onde guidée pour liaisons optiques à 1,55 µm" [Guided wave electroabsorbent modulators for optical links at 1.55 µm] published in L'écho des Recherches, No. 149, 3rd quarter 1992.

An electroabsorbent modulator of the type presently known is shown diagrammatically in FIG. 1. Such a modulator is a diode including two thin layers 1 and 2 of material doped to be N-type and P-type respectively. Between these two layers 1 and 2 there is interposed a layer 3 which constitutes a region that is not intentionally doped and in which an electroabsorbent material is included. Such an N-I-P diode is formed to constitute a waveguide structure.

Absorption by the electroabsorbent material in the intermediate layer 3 varies as a function of the voltage V applied across the two thin layers 1 and 2 of the diode.

It is common practice to characterize the transmission of a layer that includes an electroabsorbent material by the ratio of the outlet over inlet powers of a light beam applied to said layer. FIG. 2a of the accompanying drawings shows the transmission curve of the FIG. 1 modulator as a function of the voltage V applied across its two doped thin layers 1 and 2. As shown by that curve, when the diode that constitutes the modulator is forward biased (V greater than zero), current passes through the diode and the electroabsorbent material operates under laser or optical amplifier conditions (part I of the curve).

In contrast, when the diode is reverse biased (V less than zero) it ceases to conduct and an electric field is generated across the electroabsorbent material. The absorption of the material varies as a function of the applied voltage V. In particular, the electroabsorbent material is transparent so long as said voltage is low or zero (part II of the curve) and it is absorbent for voltages of larger absolute value (part III of the curve).

To generate short light pulses, proposals have already been made to control such an electroabsorbent modulator by means of a sinewave voltage signal.

In this respect, reference may advantageously be made to the article "Transform-limited 14 ps optical pulse generation with 15 GHz repetition rate by InGaAsP electroabsorption modulator", by M. Suzuki, H. Tanaka, K. Utaka, N. Edagaw, and Y. Matsuchima, Electronics Letters, May 21, 1992, Vol. 28, No. 11.

As described in that article, such a signal reverse biases the modulator-constituting diode. It is fixed in frequency and its amplitude is much greater than the control voltage of the modulator.

FIG. 2b shows a sinewave signal S for applying voltage control to an electroabsorbent modulator having the transmission curve of FIG. 2a. As can be seen in FIG. 2b, it is only when the sinewave is at peak values close to zero voltage that the signal S takes on values in which it causes the electroabsorbent material to take up the transparent state.

The pulses generated in this way are short pulses at a repetition rate that is equal to the frequency of the control signal. They are shown in FIG. 3.

Such a light pulse generator presents several drawbacks.

Given that the transparent state of the electroabsorbent modulator corresponds to the peaks of the sinewave of the controlling signal, there is limited scope for adjusting the width of the resulting pulses. In particular, the ratio of pulse width over repetition period is greater than some minimum value. The existence of that minimum value prevents presently known electroabsorbent modulators being used for generating pulses that are very short, and in particular prevents such electroabsorbent modulators being used in techniques for time multiplexing a plurality of pulse trains.

Furthermore, with such a light pulse generator, it is necessary to monitor the control voltage signal continuously for possible drift. To avoid jeopardizing the reliability of the device, the control voltage must not exceed the avalanche voltage of the diode. Also, to prevent the electroabsorbent material operating under amplifying or lasing conditions, the control signal must remain negative.

OBJECTS AND SUMMARY OF THE INVENTION

The main object of the present invention is to mitigate those various drawbacks.

To this end, the present invention provides a light pulse generator comprising:

a source for generating a light beam;

an electroabsorbent modulator for modulating said light beam into light pulses, said electroabsorbent modulator including at least two doped layers and at least one intermediate layer interposed between said two layers, the intermediate layer being made of a material that is not intentionally doped and that has an electroabsorbent material included therein, the electroabsorbent or transparent state of said intermediate layer being controlled by a voltage applied across two of the layers; and means for controlling said modulator by means of a periodic type control voltage;

wherein the two layers of the modulator between which the voltage is applied have doping of the same sign, light transmission of the modulator as a function of the control voltage applied thereto being at a maximum in the vicinity of zero volts and being symmetrical thereabout, the control voltage for the modulator being a periodic voltage centered on zero volts.

BRIEF DESCRIPTION OF THE DRAWINGS

Other characteristics and advantages appear from the following description of one possible embodiment of the invention. The description should be read with reference to the accompanying drawings, in which.

MORE DETAILED DESCRIPTION

Figure 1:
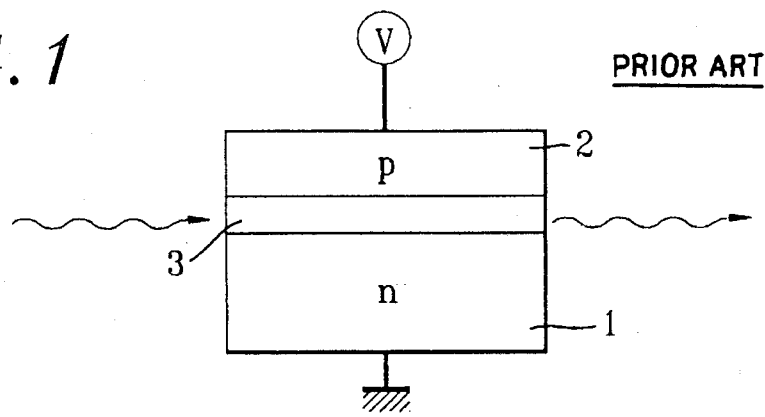
FIGS. 1, 2a, 2b, and 3 are described above with reference to the prior art.
Figure 2A:
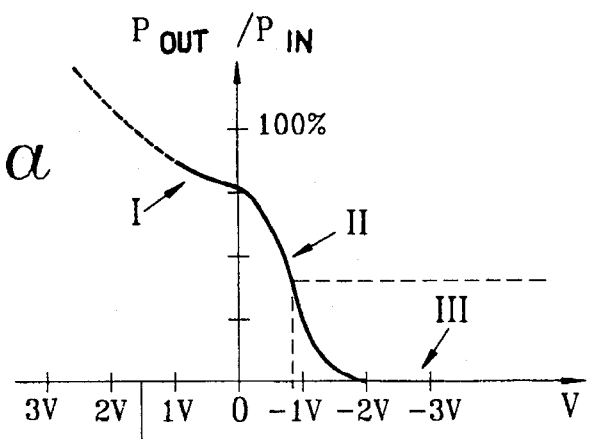
Figure 2B:
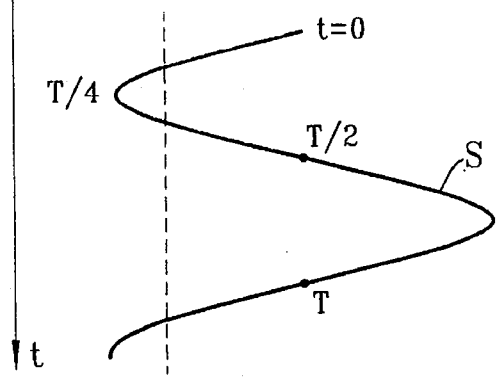
Figure 3:
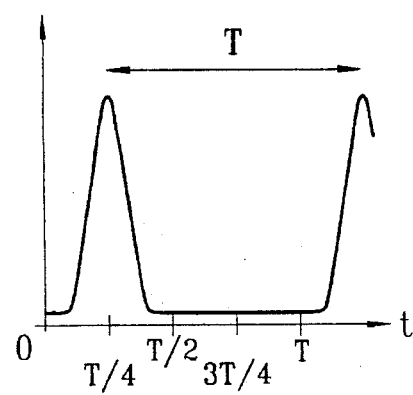
Figure 4A:
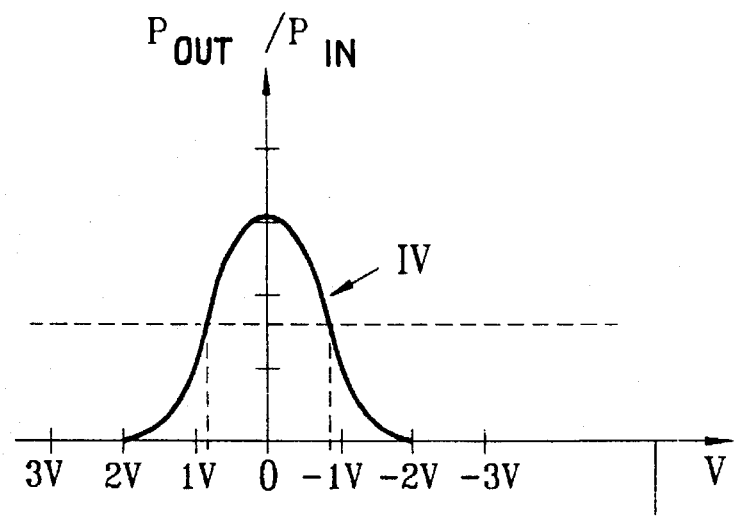
FIG. 4a shows the transmission characteristic curve as a function of voltage for the electroabsorbent modulator in the generator of the invention.

According to the invention, it is proposed to use a modulator whose transmission characteristic as a function of voltage applied to the terminals of the modulator is at a maximum at voltages in the vicinity of zero and is symmetrical about 0 volts. Such a characteristic is represented by the curve in FIG. 4a where the transmission zone of such a modulator is given reference IV in FIG. 4a.

Periodic pulses are advantageously generated with a modulator having a transmission characteristic of this type by means of a periodic control signal centered on 0 volts, e.g. a sinewave. A control voltage of this type is shown in FIG. 4b.

Figure 4B:
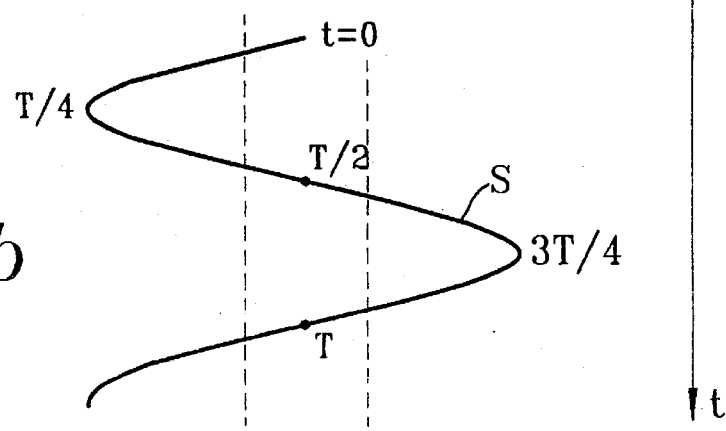
FIG. 4b is a diagram showing a sinewave signal for applying voltage control to a modulator having the transmission characteristic shown in FIG. 4a, said signal enabling periodic light pulses to be generated.
Figure 5:
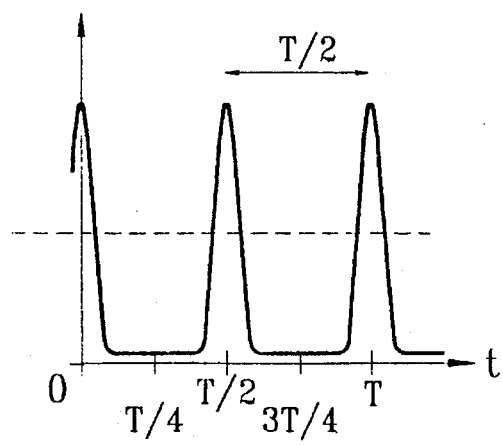
FIG. 5 shows a train of output light pulses generated using the sinewave signal of FIG. 4b.

As can be seen in FIG. 4b, the portion of the signal that causes the modulator to take on the transparent state is the portion where the rate of change in the control signal is at its fastest (maximum slope). Thus, the ratio of the width of the generated pulses to the repetition period is no longer limited and it may be much smaller than that possible with prior art electroabsorbent modulators. A train of light pulses generated with such a control signal is shown in FIG. 5.

There follows a description of several examples of electroabsorbent modulators whose light transmission characteristic are of the type shown in FIG. 4.

In general, a modulator of the invention is of a structure that makes it the equivalent of an assembly comprising two prior art type modulators connected opposite ways round. Thus, when the control voltage applied to the assembly is non-zero, one of the diodes constituting said modulators is forward biased while the other is reverse biased. The transparent state of the modulator is obtained only when the voltage across the terminals of each of the two equivalent diodes is close to 0 volts, i.e. when the control voltage across the terminals of the modulator is itself close to 0 volts.

Figure 6:
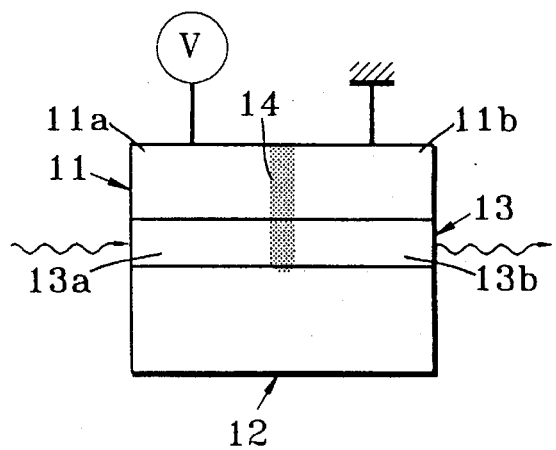
FIGS. 6 to 8 are diagrams showing several possible variant kinds of electroabsorbent modulator.

The modulator shown in FIG. 6 mainly comprises two doped layers 11 and 12, one N-type and the other P-type between which there is interposed an intermediate layer 13 that is not intentionally doped and that has an electroabsorbent material included therein.

Localized transverse insulation 14 cuts across the thickness of the layers 11 and 13 and separates these two layers into two mutually insulated half-layers given respective references 11a, 11b and 13a, 13b. This produces two diodes that are electrically connected in series with opposite forward conduction directions. One of the diodes is constituted by the layers 11a and 12 passing through intermediate layer 13a, while the other one is constituted by layers 12b and 11b, passing through intermediate layer 13b. As shown diagrammatically in FIG. 6, the control voltage V is applied across the two layers 11a and 11b that have same-sign doping.

When one or other of the layers 13a and 13b is absorbent, i.e. when the control voltage takes a value that is remote from 0 volts, then one of the two intermediate layers 13a and 13b is absorbent. The modulator constituted in this way is therefore absorbent.

On the contrary, when the control voltage is close to zero volts, then both layers 13a and 13b are transparent. Transmission is at a maximum.

Figure 7:
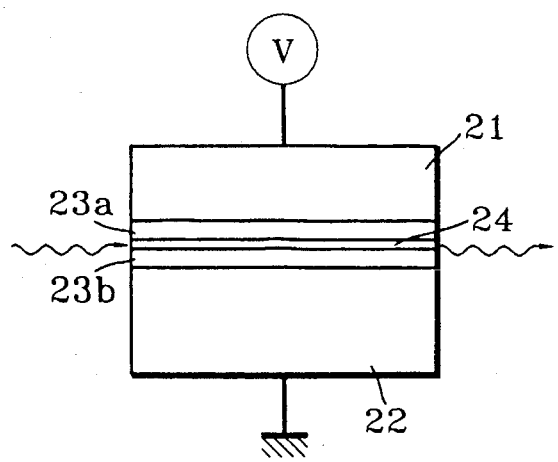

Reference is now made to FIG. 7 which shows an electroabsorbent modulator constituting another possible embodiment of the invention. This modulator comprises two layers 21 and 22 both having same-sign doping (P or N) with an intermediate layer 23 interposed between them. This intermediate layer 23 is itself subdivided into two sublayers 23a and 23b by a layer 24 that is doped with the sign opposite to the sign of the doping in the layers 21 and 22. Neither of the sublayers 23a and 23b is intentionally doped, and both of them include an electroabsorbent material.

Such a structure is thus equivalent to two N-I-P diodes that are superposed and that have opposite conduction directions, one of said diodes being constituted by the layer 21, the sublayer 23a, and the doped layer 24, while the other diode is constituted by the substrate 22, the sublayer 23b, and the doped layer 24. When a non-zero voltage is applied across the layers 21 and 22, one of the two above-specified diodes is forward biased while the other is reverse biased. The voltage across the terminals of the forward biased diodes is substantially zero whereas the voltage across the terminals of the other diode is substantially equal to the voltage of the control signal. The modulator made in this way therefore presents maximum transparency when both sublayers 23a and 23b are transparent, i.e. when the control voltage is close to zero volts.

Figure 8:
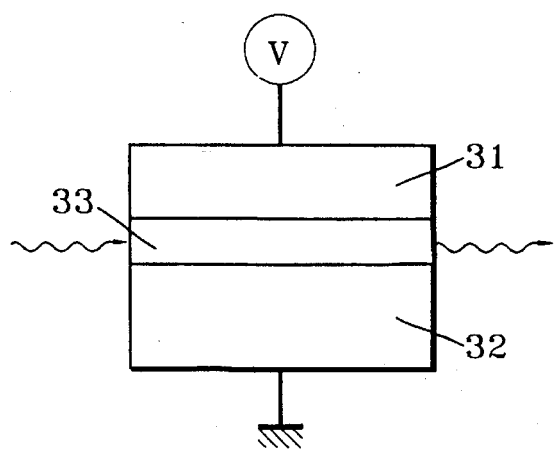

FIG. 8 shows another possible embodiment of a modulator for the invention. This modulator has two layers 31 and 32 between which there is interposed a layer 33 that is not intentionally doped and that has an electroabsorbent material included therein. The layers 31 and 32 have same-sign doping (N or P). The layers 31 and 32, and the intermediate layer 33 thus constitute an N-I-N or a P-I-P diode. The operation of such a diode forming an electroabsorbent modulator is substantially analogous to that of the modulator shown in FIG. 7.

In the various embodiments described above, the N or P doped layers are conventionally semiconductor materials taken from columns III and V of the periodic table, and they are grown epitaxially on a substrate.

In the embodiment that includes insulation, the insulation may be implemented by implanting $H^+$ ions, for example.

The electroabsorbent materials may be solid III-V semiconductor materials exhibiting the Franz-Keldysh effect, materials with a quantum well structure, or materials having a superlattice structure with Wannier-Stark localization. For the manufacture and implementation thereof reference may advantageously be made to the following publications:

E. Bigan, "Modulateurs électroabsorbants non guidés pour liaisons optiques à 1,55 µm", L'écho des Recherches, No. 149, 3rd quarter 1992;

F. Devaux, E. Bigan, A. Ougazzaden, B. Pierre, F. Huet, M. Carré, and A. Carenco, "InGaAsP/InGaAsP multiple-quantum-well modulator with improved saturation intensity and bandwidth over 20 GHz", IEEE, 1041–1135, 1992;

F. Devaux, "Fabrication, caractérisation et mise en oeuvre des modulateurs élecroabsorbants non guidés à 1,55 µm pour les liaisons à trés haut débit" [Manufacture, characterization, and implementation of non-guided electroabsorbent modulators at 1.55 µm for very high bit rate links], thesis defended Mar. 26, 1993 at Université de Paris Sud, Centre d'Orsay.

The teachings of the above references that relate to the present invention can be summarized as follows. The electroabsorbent modulator comprises doped and intermediate layers which are epitaxially grown on a InP substrate. The intermediate layer is unintentionally doped and comprises twenty InGaAsP ($\lambda_{PL}$=1.57 µm) 12 nm-thick wells separated by nineteen InGaAsP ($\lambda_{PL}$=1.15 µm) 6 nm-thick barriers. The P-doped layers are, for example, InP layers of 1.8 µm with a concentration of zinc doping elements of $7\times10^{17}$ $cm^{-3}$. The N-doped layers are, for example, InP layers of 0.05 µm with a concentration of silica doping elements of $10^{18}$ $cm^{-3}$.

Figure 9:
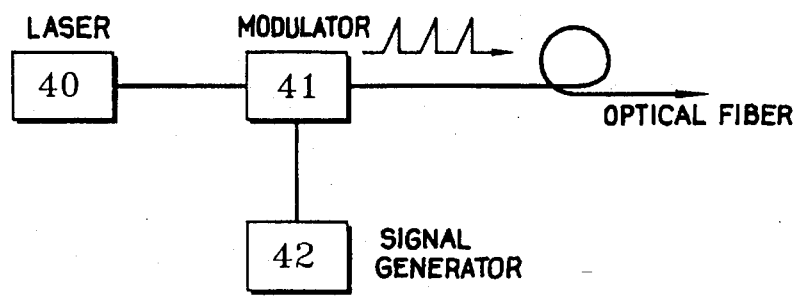
FIG. 9 is a block diagram of a light pulse generator of the invention.

The light pulse generator shown in FIG. 9 comprises, in conventional manner, a laser source 40 and an electroabsorbent modulator 41 that is voltage controlled by a sinewave voltage generator 42.

According to the invention, the modulator 41 is of the type described above. The generator 42 provides a periodic type control signal centered on zero volts, e.g. a sinewave signal.

As it will have been observed, the light pulse generators and the electroabsorbent modulators described above make it possible to mitigate these various drawbacks of electroabsorbent modulators in the state of the art.

In particular:

they enable light pulses to be obtained for which the ratio of pulse width over repetition period is not limited;

the control voltages are of smaller amplitude than the control voltages of prior art electroabsorbent modulators; and they make it possible to avoid any risk of exceeding the avalanche voltage or of operation under lasing or amplifying conditions.

It will also be observed that generators and modulators of the invention present the advantage of generating pulses in which the repetition rate is double the frequency of the control signal, whereas the repetition rate for prior art light pulse generators is equal to the frequency of the control signal.

I claim:

1. A light pulse generator comprising:

a source for generating a light beam;

an electroabsorbent modulator for modulating said light beam into light pulses, said electroabsorbent modulator including at least two doped layers and at least one intermediate layer interposed between said two layers, the intermediate layer being made of a material that is not intentionally doped and that has an electroabsorbent material included therein, the electroabsorbent or transparent state of said intermediate layer being controlled by a voltage applied across two of the layers; and means for controlling said modulator by means of a periodic type control voltage;

wherein the two layers of the modulator between which the voltage is applied have doping of the same sign, light transmission of the modulator as a function of the control voltage applied thereto being at a maximum in the vicinity of zero volts and being symmetrical thereabout, the control voltage for the modulator being a periodic voltage centered on zero volts.

2. A generator according to claim 1, wherein the modulator includes at least one layer having doping of sign opposite to the doping of the layers between which the control voltage is applied and which co-operates therewith and with the intermediate layer(s) to form two P-I-N diodes connected with opposite forward conduction directions.

3. A generator according to claim 2, wherein the intermediate layer is interposed between two layers one of which has N-type doping and the other P-type doping, transverse insulation extending through the thickness of one of said two layers and through the intermediate layer.

4. A generator according claim 2, wherein the intermediate layer lies between two layers having same-sign doping and is itself subdivided into two sublayers by an interposed layer that has opposite-sign doping.

5. A generator according to claim 1, wherein the modulator comprises a P-I-P diode or an N-I-N diode.

* * * * *